United States Patent
Vanni et al.

(10) Patent No.: US 10,465,782 B2
(45) Date of Patent: Nov. 5, 2019

(54) TORQUE CONVERTER HAVING PRELOADED TURBINE PISTON

(71) Applicant: Schaeffler Technologies AG & Co. KG, Herzogenaurach (DE)

(72) Inventors: Jeremy Vanni, Wooster, OH (US); Matthew Payne, Glenmont, OH (US); Markus Steinberger, Macedonia, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 68 days.

(21) Appl. No.: 15/588,356

(22) Filed: May 5, 2017

(65) Prior Publication Data

US 2017/0328457 A1 Nov. 16, 2017

Related U.S. Application Data

(60) Provisional application No. 62/334,258, filed on May 10, 2016.

(51) Int. Cl.
| F16H 45/02 | (2006.01) |
| F16D 13/32 | (2006.01) |
| F16D 25/0632 | (2006.01) |
| F16F 15/131 | (2006.01) |

(52) U.S. Cl.
CPC ............. *F16H 45/02* (2013.01); *F16D 13/32* (2013.01); *F16D 25/0632* (2013.01); *F16F 15/13121* (2013.01); *F16H 2045/0247* (2013.01); *F16H 2045/0284* (2013.01)

(58) Field of Classification Search
CPC ............. F16H 45/02; F16H 2045/0205; F16H 2045/0221; F16H 2045/0247; F16H 2045/0284; F16H 41/24; F16D 13/32; F16D 25/0632; F16F 15/132
See application file for complete search history.

(56) References Cited

U.S. PATENT DOCUMENTS

| 2,130,895 | A | * | 9/1938 | Ness | ..................... F16D 47/06 |
| | | | | | 192/3.26 |
| 3,463,033 | A | * | 8/1969 | Fisher | ................... F16H 47/085 |
| | | | | | 192/3.26 |
| 2014/0097055 | A1 | | 4/2014 | Lindemann et al. | |
| 2015/0021137 | A1 | | 1/2015 | Lindemann et al. | |
| 2015/0027110 | A1 | | 1/2015 | Lindemann et al. | |
| 2015/0152951 | A1 | | 6/2015 | Rentfrow | |
| 2016/0116038 | A1 | * | 4/2016 | Depraete | ................. F16H 41/30 |
| | | | | | 192/3.29 |

(Continued)

*Primary Examiner* — Stacey A Fluhart
*Assistant Examiner* — Lori Wu
(74) *Attorney, Agent, or Firm* — LeKeisha M. Suggs (57) ABSTRACT

A torque converter comprising: a damper assembly including a spring retainer; and, a turbine assembly connected to the damper assembly, the turbine assembly including: a turbine shell including an axially movable turbine piston; a drive plate fixed to the turbine piston; and a diaphragm spring, the drive plate having openings for receiving the diaphragm spring; the diaphragm spring acting on the turbine piston with a preload force. In an example aspect, the diaphragm spring includes a plurality of radially inward tabs and the drive plate includes a plurality of openings for receiving the radially inward tabs.

17 Claims, 7 Drawing Sheets

(56) References Cited

U.S. PATENT DOCUMENTS

| | | | |
|---|---|---|---|
| 2016/0116041 A1* | 4/2016 | Depraete | F16H 45/02 192/3.29 |
| 2016/0160975 A1* | 6/2016 | Depraete | F16D 47/06 192/3.26 |
| 2017/0211673 A1* | 7/2017 | Norwich | F16H 45/02 |
| 2017/0227101 A1* | 8/2017 | Depraete | F16H 45/02 |

* cited by examiner

TORQUE CONVERTER HAVING PRELOADED TURBINE PISTON

FIELD

The present disclosure relates generally to torque converters and more specifically torque converters having a preloaded clutch for self engaging a turbine piston torque converter in the coast condition.

BACKGROUND

U.S. Publication No. 2015/0027110 discloses an elastic element preloading an axially movable turbine. U.S. Publication No. 2014/0097055 discloses a torque converter with a turbine piston, which is an axially movable turbine used as a piston of a lockup clutch. U.S. Publication No. 2016/0116041 discloses a torque converter including an impeller, a turbine-piston drivable by the impeller, and an annular lockup resistance member.

BRIEF SUMMARY

Example aspects broadly comprise a torque converter comprising: a damper assembly including a spring retainer; and, a turbine assembly connected to the damper assembly, the turbine assembly including: a turbine shell including an axially movable turbine piston; a drive plate fixed to the turbine piston; and a diaphragm spring, the drive plate having openings for receiving the diaphragm spring; the diaphragm spring acting on the turbine piston with a preload force. In an example aspect, the torque converter further includes a hub, the spring retainer configured for connecting to a transmission input shaft via the hub. In an example aspect, the diaphragm spring includes a plurality of radially outward tabs configured for contacting an outer surface of the turbine shell. In an example aspect, the damper assembly further including a bearing assembly, the spring retainer disposed within the bearing assembly; wherein the diaphragm spring includes a plurality of radially inward tabs configured for contacting a turbine side surface of the bearing assembly. In an example aspect, the drive plate including a plurality of openings for receiving the plurality of radially inward tabs. In an example aspect, the bearing assembly further includes a washer, disposed on the turbine side axially, for balancing a load as provided by the radially inward tabs contacting the bearing assembly. In an example aspect, the turbine piston includes a multi-plate cone clutch.

Other example aspects broadly comprise a torque converter comprising: an impeller; a turbine including a turbine piston of single-piece construction, the turbine piston axially movable toward and away from the impeller; a damper assembly coupled to the turbine, the damper assembly including: a spring retainer; and, a resilient element, disposed between the spring retainer and the turbine, arranged for applying a preload force urging the turbine against the impeller in a coast condition. In an example aspect, the turbine piston includes a multi-plate cone clutch. In an example aspect, the resilient element includes first and second contact surfaces for contacting the damper assembly and the turbine, respectively. In an example aspect, the damper assembly further including a plurality of springs and a drive plate for engaging the plurality of springs. In an example aspect, the resilient element further includes a plurality of fingers disposed radially inward. In an example aspect, the drive plate further includes a plurality of openings for receiving the plurality of fingers. In an example aspect, the torque converter further includes a cover for connecting to an engine and the damper assembly further including a bearing assembly; the bearing assembly including a thrust surface for slidingly engaging the front cover. In an example aspect, the bearing assembly comprises first and second bearings disposed axially on either side of the spring retainer, the first bearing for contacting the cover and the second bearing for contacting the resilient element. In an example aspect, the first and second bearings are rolling bearings. In an example aspect, the bearing assembly comprises a thrust washer disposed on the cover side of the spring retainer for contacting the cover and a roller bearing disposed on the turbine side of the spring retainer for contacting the resilient element. In an example aspect, the spring retainer includes at least one lanced portion for centering the bearing assembly. In an example aspect, a first side of the turbine faces the impeller and a second side of the turbine faces the damper, the resilient element being designed such that the turbine is forced away from the impeller when a pressure on the first side of the turbine exceeds a pressure on the second side of the turbine by a predetermined amount. In an example aspect, the resilient element is compressed when the pressure on the first side of the turbine exceeds the pressure on the second side of the turbine by the predetermined amount.

Other example aspects broadly comprise a torque converter comprising: an impeller fixedly attached to a cover to form a housing; a turbine including a turbine piston and a multi-plate cone clutch, the turbine piston axially movable toward and away from the impeller; a damper assembly coupled to the turbine, the damper assembly including: a spring retainer including a bearing assembly, the bearing assembly in contact with the cover; and, a diaphragm spring, disposed between the spring retainer and the turbine, and having a plurality of radially inward fingers; a drive plate fixedly attached to the turbine and having a plurality of openings for receiving the plurality of radially inward fingers; and, a thrust path: generated by the diaphragm spring arranged for applying a preload force urging the turbine against the impeller in a coast condition; thrusting against the turbine at a first contact surface to load the multi-plate cone clutch; balanced by the impeller fixedly attached to the cover; and, rotationally separated from the cover by a first bearing thrusting through the spring retainer to a second bearing in contact with the diaphragm spring to close the circuit.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

By "non-rotatably connected" components we mean: any time one of the components rotates, all of the components rotate; and relative rotation between the components is not possible. Axial or radial displacement between components is possible, but not required.

The disclosure provides a torque converter having an impeller and front cover that are fit together. That is, a cover rim is installed into a mating impeller, although alternatively a rim of an impeller may be installed into a mating front cover. The two components are then fixed together by welding to form the torque converter housing. A displaceable elastic element takes up tolerances so that the turbine clutch is engaged with the impeller in a no pressure condition. In other words, the torque converter is assembled without any torque converter clutch liftoff. Increasing release pressure pushes the turbine clutch away from the impeller and further compresses the resilient element. Elastic element and resilient element are herein used interchangeably.

Torque converters that use the turbine shell as a piston plate, referred to herein interchangeably as a turbine piston and understood to be of single-piece construction with the turbine shell, may experience turbine thrust causing the housing to expand or balloon. In the coast condition (where the turbine rotates at a greater speed than the impeller), the turbine thrust is directed towards the engine, disengaging the clutch. Such torque converters may require the use of an elastic or resilient element between the turbine shell and front cover shell to control liftoff of the torque converter clutch and to aid in coast lockup. This has the additional benefit whereby flow or pressure may be stopped during engaged periods resulting in increased fuel economy. Without an elastic or resilient element, component tolerances for a normally open clutch could result in a large gap at the friction interface if the torque converter is assembled to a solid stop. The large gap may prevent the clutch from engaging if the pressure force cannot overcome the turbine thrust force, or may result in a harsh engagement if the large gap is suddenly closed.

The resilient element provides enough deflection to cover stack up tolerances and TC ballooning. That is, the resilient element is designed to keep the turbine friction material engaged with the impeller when combined component tolerances result in a maximum distance between the turbine and the cover, and preloaded such that the clutch remains in contact during axial growth of the torque converter due to hydrodynamic pressure under high rotational speeds. During clutch apply, where the turbine is forced against the impeller by a clutch differential pressure, the preload fingers act in the same direction as the clutch differential pressure. In clutch release, where the turbine is forced away from the impeller by a pressure inside the torus separates the impeller and the turbine, pushing the turbine against the resilient element. The pressure required to release the clutch is increased to overcome the force of the resilient element, which improves coast engagement by allowing the apply force build-up even at low apply flow and low apply pressure.

Figure 1A:
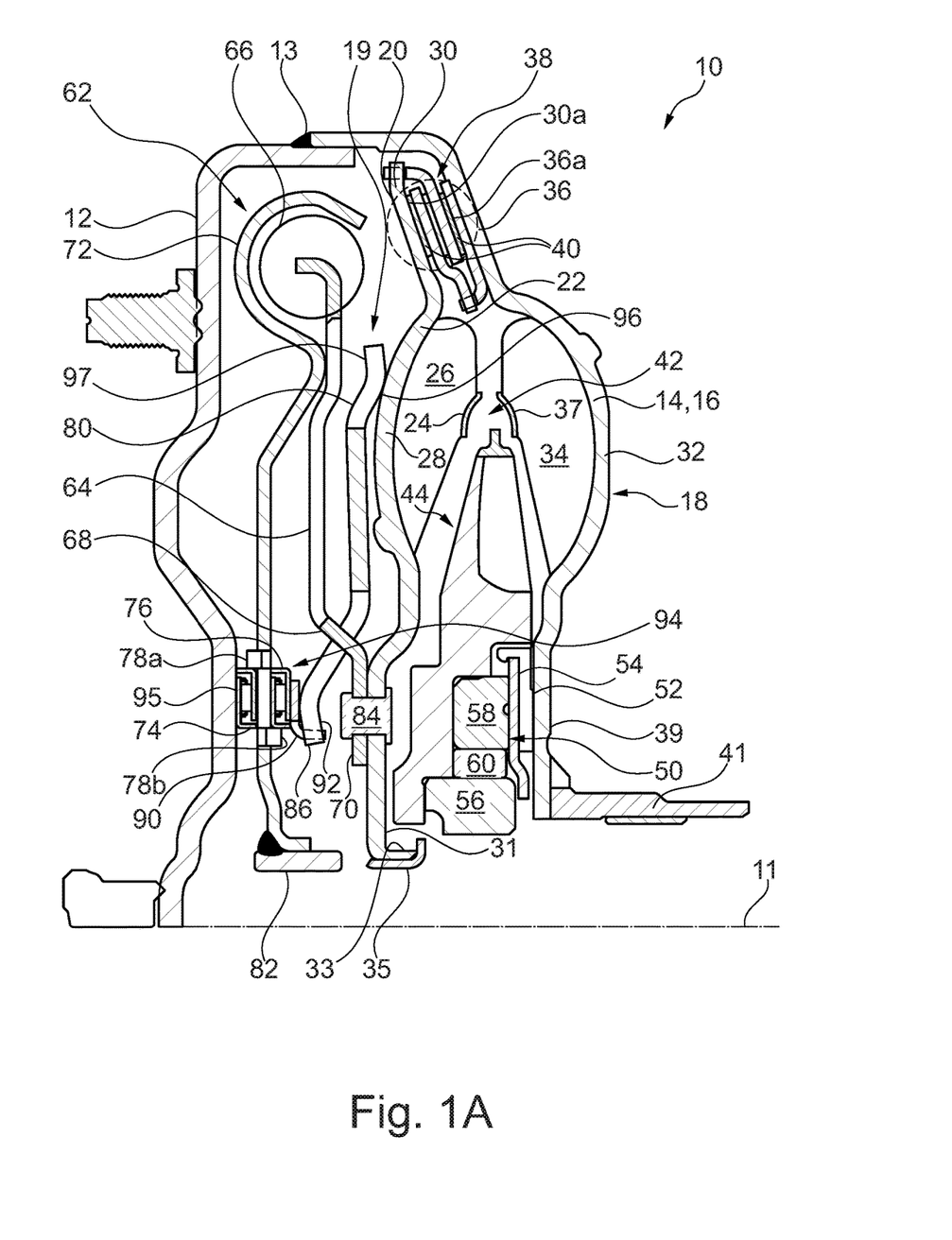
FIG. 1A illustrates a partial cross sectional side view of a torque converter having a preloaded turbine piston according to an example aspect.

FIG. 1A shows cross-sectional side view of torque converter 10 in accordance with an embodiment of the present invention. Torque converter 10 is rotatable about a center axis or axis of rotation 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11. Torque converter 10 also includes a turbine assembly 19 in accordance with an embodiment of the present invention. Turbine assembly 19 includes turbine piston 20 configured to be axially moveable toward and away from impeller 18 to engage and disengage an impeller clutch of impeller 18 so as to form a lockup clutch. Turbine piston 20 includes a turbine shell 22 and a core ring 24 supporting a plurality of turbine blades 26 therebetween.

Turbine shell 22 includes a rounded blade supporting portion 28, which is shaped as an annular bowl, for contacting engine side edges of turbine blades 26. Radially outside of blade supporting portion 28, an outer radial extension 30, which forms the piston, radially protrudes outwardly from an outer circumference of blade supporting portion 28 to define an annular protrusion having a flat annular radially extending impeller facing surface 30a and having an outermost circumference that defines an outermost circumference of turbine piston 20. Accordingly, the piston and turbine shell 22 are formed as a single piece. Radially inside of blade supporting portion 28, turbine shell 22 includes an annular inner radial extension 31 that, at an inner radial end thereof, joins an axially extending inner circumferential section 33, whose inner circumferential surface contacts an outer circumferential surface of a hub 35.

Impeller 18 includes impeller blades 34, which are each fixed at a transmission side thereof to impeller shell 16 and are each fixed to an impeller core ring 37 at an engine side thereof by tabs. Impeller shell 16 includes a rounded blade supporting portion 32, which is shaped as an annular bowl, for contacting transmission side edges of impeller blades 34. Radially outside of blade supporting portion 32, a radially extending wall 36 radially protrudes outwardly from an outer circumference of rounded blade supporting portion 32 to define an annular wall having a flat annular radially extending turbine facing surface 36a. Accordingly, the impeller clutch and impeller shell 16 are formed as a single piece. Radially inside of blade supporting portion 32, impeller shell 16 includes an annular inner radial extension 39 extending radially inward from blade supporting portion 32. A radially inner end of extension 39 is connected to an impeller hub 41. As shown in FIG. 1A, in a non-limiting example aspect, multi-plate cone clutch 38 is used for greater clutch capacity, however, any turbine piston configuration may be used.

A friction material 40 is bonded onto radially extending impeller facing surface 30a of outer radial extension 30 for engaging multi-plate cone clutch 38. In other embodiments, instead of or in addition to being bonded to outer radial extension 30, friction material 40 may be bonded to radially extending turbine facing surface 36a of radially extending wall 36. Regardless of whether friction material 40 is bonded to outer radial extension 30 or radially extending wall 36, friction material 40 is provided axially between surfaces 30a, 36a and to plate surfaces therebetween.

Torque converter 10 also includes a stator 42 axially between turbine 20 and impeller 18 to redirect fluid flowing from the turbine blades 26 before the fluid reaches impeller 18 to increase the efficiency of torque converter 10. Stator 42 includes stator casting 44 including a plurality of blades 46 and a stator body 48. Stator 42 also includes a one-way clutch 50 held within stator body 48 by a centering plate 52. An axial thrust washer 54, which is axially between stator 42 and impeller 18, is fixed to stator 42 at an outer circumference of centering plate 52. One-way clutch 50 includes an inner race 56, an outer race 58 and rollers and springs 60 radially between inner race 56 and outer race 58. Stator casting 44 is rotationally fixed to outer race 58, and depending on the operating conditions of torque converter 10, inner race 56 and outer race 58 are rotationally fixed to each other or rotatable relative to each other.

A damper assembly 62 is positioned between front cover 12 and turbine 20 and is configured for transferring torque from turbine 20 to a transmission input shaft. Springs 66 are retained by spring retainer 72 that wraps around a contour of the outer diameter of springs 66 and is formed at a radially outer end of damper assembly 62. Spring retainer 72 is disposed between bearings 74, 76 providing a means for rotational separation between cover 12 and diaphragm spring 80. Non-limiting bearings as known in the art such as roller or hydrodynamic may be used. Cover side bearing 74 is centered by lanced feature 78a of spring retainer 72. Turbine side bearing 76 is centered by lanced feature 78b of spring retainer 72. Damper assembly 62 includes spring retainer 72 positioned axially between bearings 74, 76 including hub 82 at a radially inner end thereof configured for non-rotatably connecting to a transmission input shaft.

In this embodiment, damper assembly 62 is connected to the turbine piston 20 for rotation therewith by drive plate 64 circumferentially engaging a radially outer set of springs 66 of damper assembly 62. Drive plate 64 is non-rotatably connected to turbine assembly 19. Drive plate 64 includes openings or windows for receiving at least a portion of a resilient member or diaphragm spring. An annular base 70 of drive plate 64 is fixed in contact with front cover facing surface of turbine shell 22 by welding or brazing or by riveting as shown at rivet 84 in FIG. 1A.

Turbine assembly 19 also includes a turbine-side bias spring 80, which in this embodiment is a diaphragm spring, provided axially between spring retainer 72 and turbine shell 22. Bias spring 80 is referred to interchangeably herein as resilient element 80 or elastic element 80 or diaphragm spring 80. An inner diameter 86 of diaphragm spring 80 includes a plurality of radially and axially extending tabs or fingers 92 for contacting washer 90. Washer 90 is arranged for balancing uneven load of diaphragm spring fingers or tabs 92. Washer 90, which may be a hydrodynamic thrust washer, provides balanced force to bearing assembly 94 including bearings 74, 76. Diaphragm spring 80 includes tabs or fingers 92 having surface 98 for contacting bearing assembly 94. At an outer diameter of diaphragm spring 80 is included tabs of fingers 97 having surface 96 for contacting turbine shell 22. In alternative embodiments, tabs or fingers 97 having surface 96 may be formed as ramps that taper.

Figure 1B:
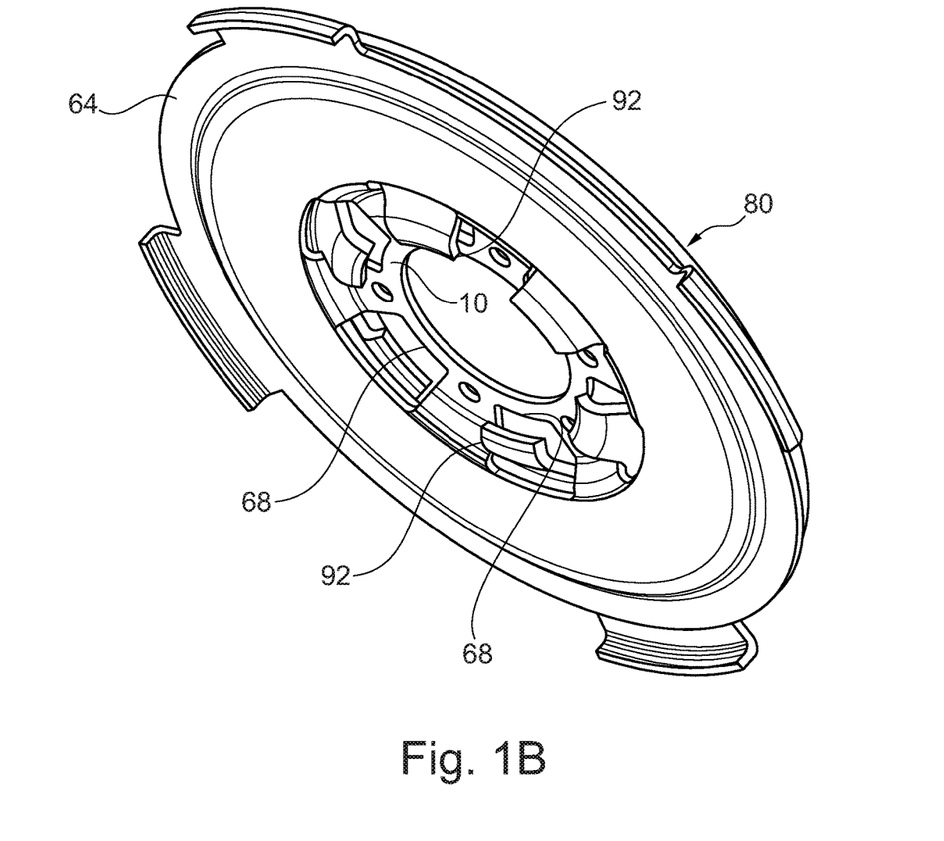
FIG. 1B shows a perspective view of a drive plate/diaphragm spring assembly according to an example aspect.
Figure 2A:
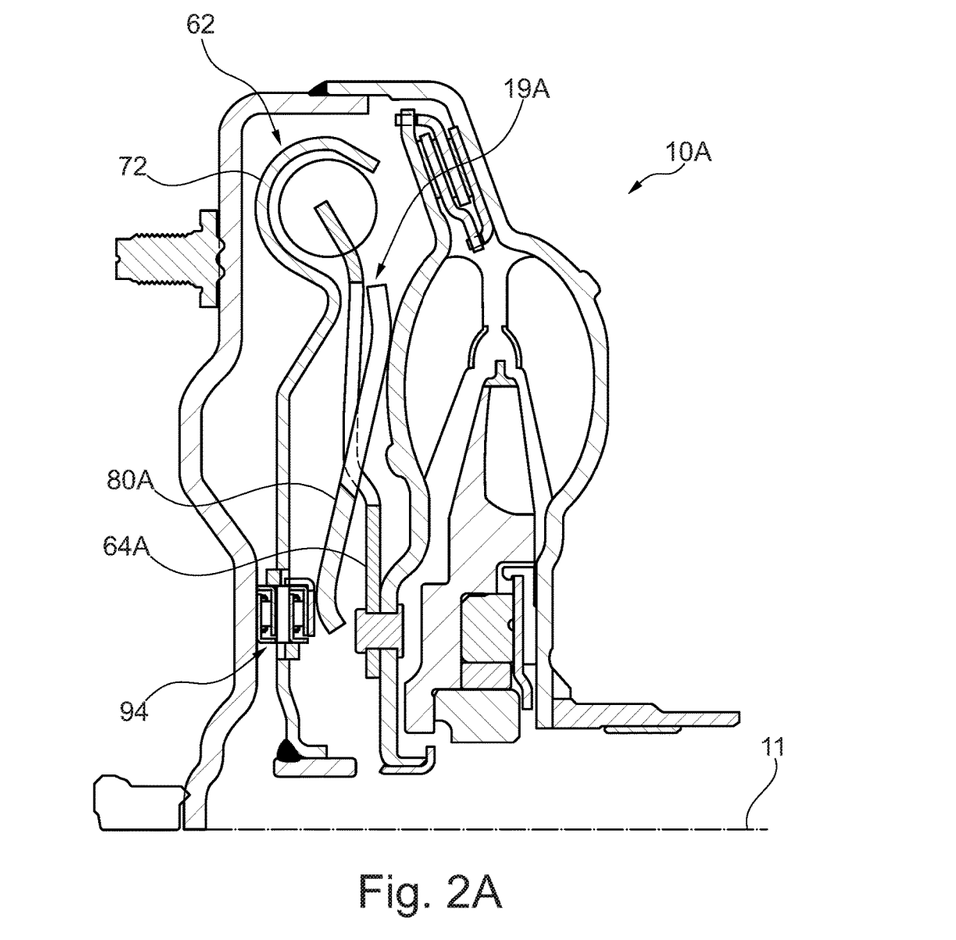
FIG. 2A illustrates an alternative embodiment of a torque converter having a preloaded turbine piston according to an example aspect.
Figure 2B:
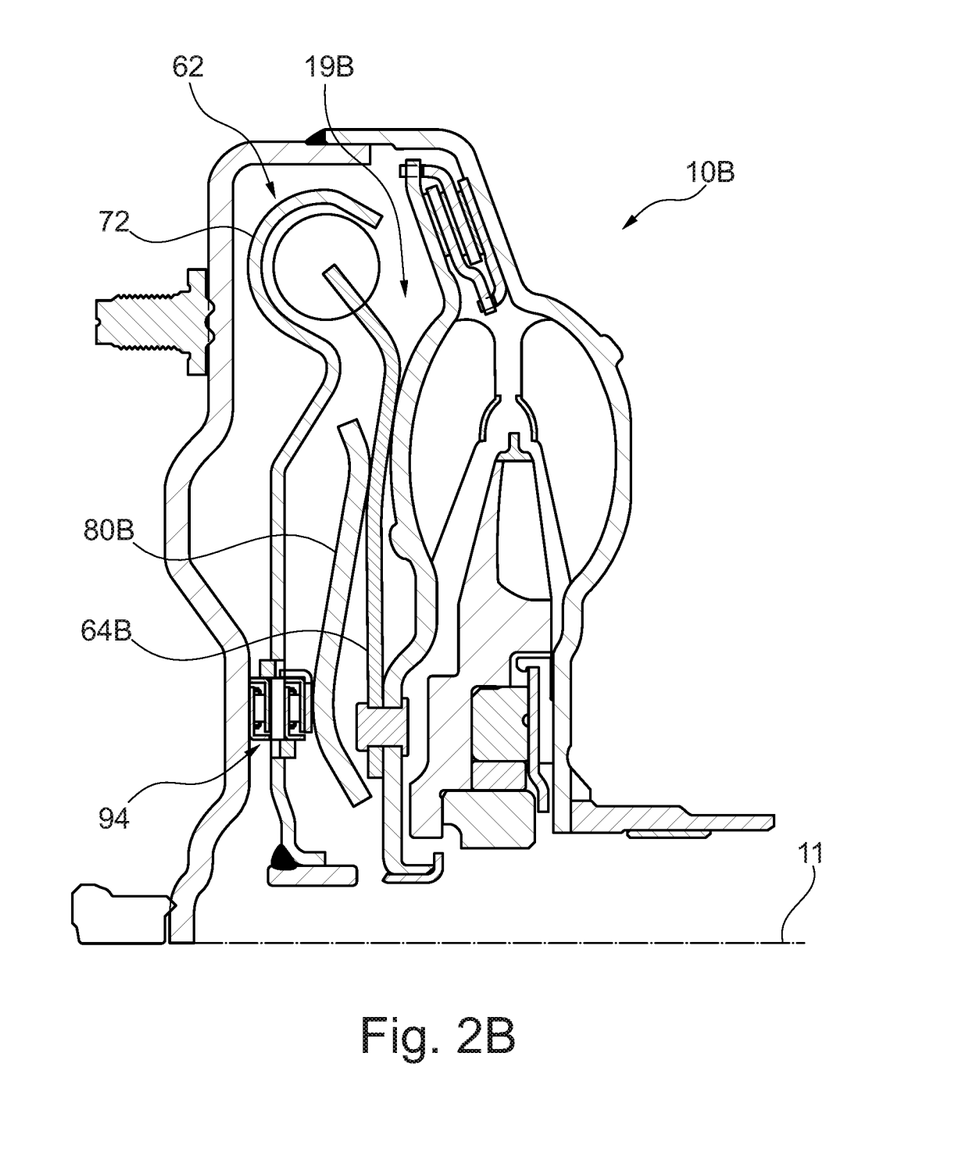
FIG. 2B illustrates an alternative embodiment of a torque converter having a preloaded turbine piston according to an example aspect.
Figure 2C:
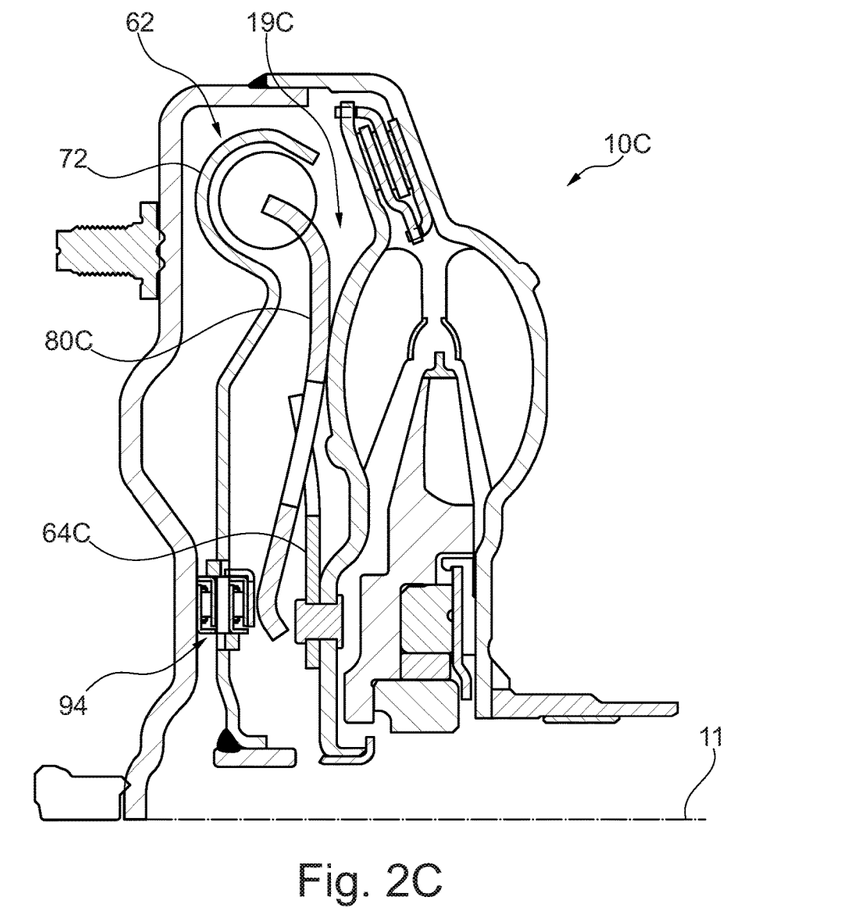
FIG. 2C illustrates an alternative embodiment of a torque converter having a preloaded turbine piston according to an example aspect.
Figure 2D:
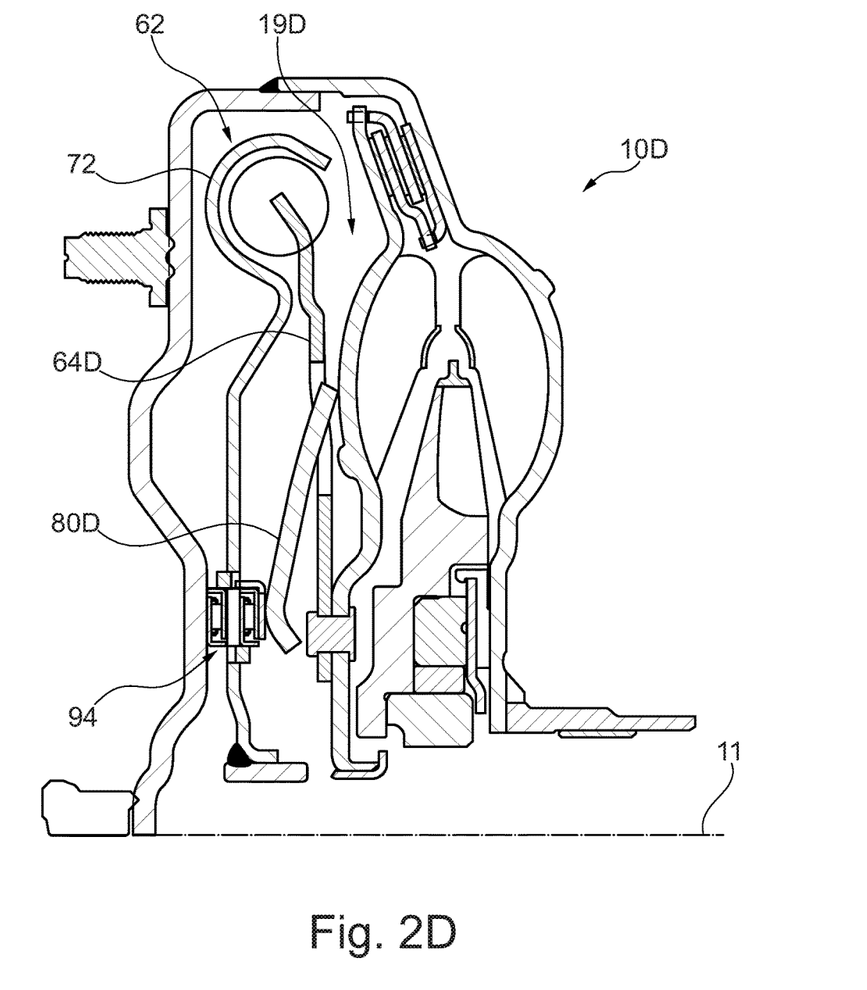
FIG. 2D illustrates an alternative embodiment of a torque converter having a preloaded turbine piston according to an example aspect; and, FIG. 3 illustrates an alternative embodiment of a torque converter having a preloaded turbine piston according to an example aspect.

FIG. 1B illustrates a perspective view of the front cover facing side of drive plate 64 and diaphragm spring 80 of turbine assembly 19. FIG. 1B shows a plurality of tabs or fingers 92 of resilient element or diaphragm spring 80 disposed within a plurality of openings or windows 68 of drive plate 64.

Figure 3:
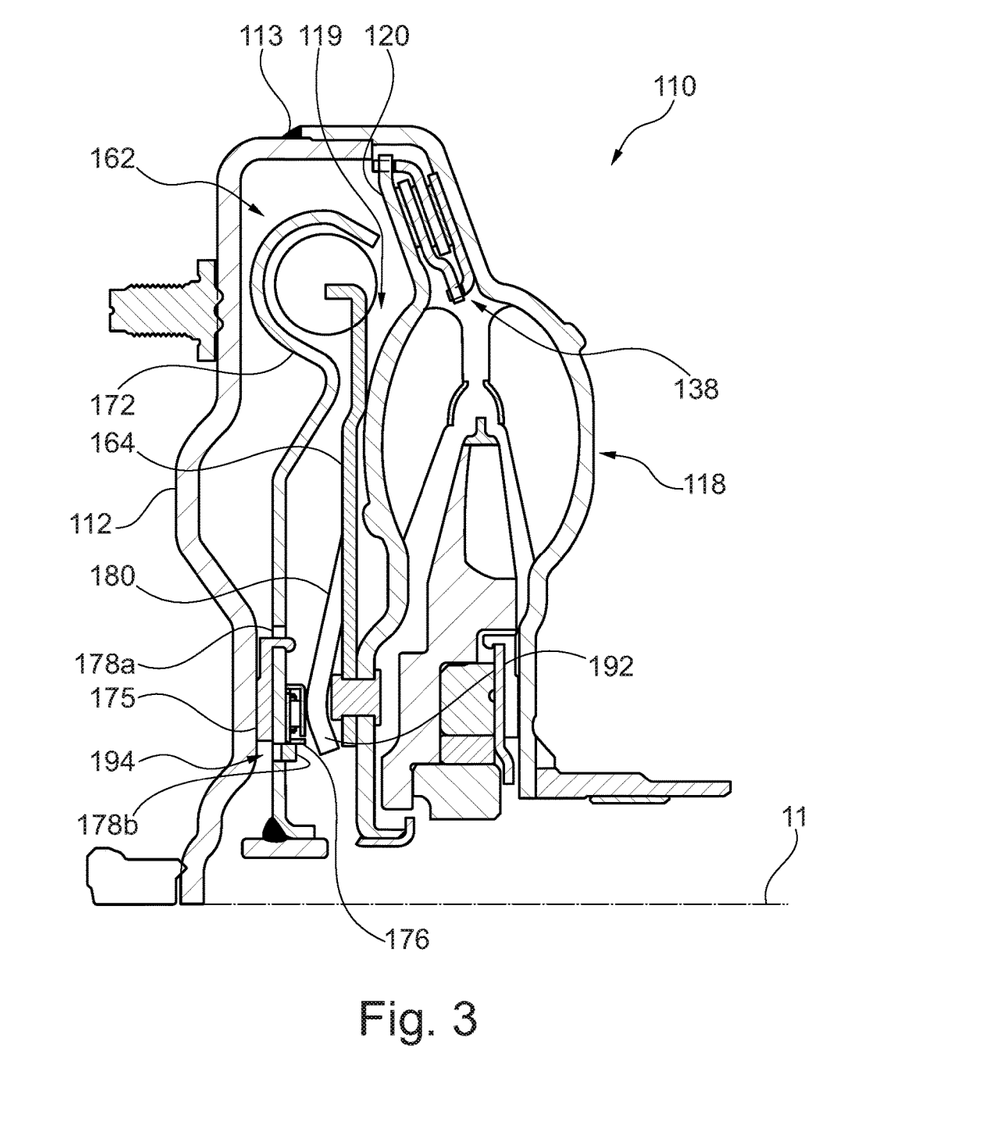

Generally, embodiments of FIGS. 1-3 show torque converter 10 having damper assembly 62 including spring retainer 72; and turbine assembly 19, (19A, 19B, 19C, 19D, 119) connected to damper assembly 62. Turbine assembly 19, (19A, 19B, 19C, 19D, 119) includes turbine shell 22 including axially movable turbine piston 20; drive plate 64, (64A, 64B, 64C, 64D, 164) fixed to turbine piston 20; and diaphragm spring 80, (80A, 80B, 80C, 80D, 180). Drive plate 64, (64A, 64B, 64C, 64D, 164) having openings or windows 68 for receiving diaphragm spring 80, (80A, 80B, 80C, 80D, 180); the diaphragm spring acting on the turbine piston with a preload force. In an example aspect, torque converter 10 further includes hub 82, spring retainer 72 configured for connecting to a transmission input shaft via hub 82. In an example aspect, diaphragm spring 80, (80A, 80B, 80C, 80D, 180) includes radially outward tabs 97 having surface 96 configured for contacting an outer surface of the turbine shell 22 at a contact point depicted by element 96. In an example aspect, damper assembly 62 further includes bearing assembly 94, (194), spring retainer 72 disposed within bearing assembly 94, (194). In an example aspect, diaphragm spring 80, (80A, 80B, 80C, 80D, 180) includes radially inward tabs 92 configured for contacting a turbine side surface of bearing assembly 94, (194). In an example aspect, drive plate 64, (64A, 64B, 64C, 64D, 164) includes a plurality of openings 68 for receiving radially inward tabs 92. In an example aspect, bearing assembly 94, (194) further includes washer 90, disposed on the turbine side axially, for balancing a load as provided by radially inward tabs 92 contacting bearing assembly 94, (194). In an example aspect, turbine piston 20 includes multi-plate cone clutch 38.

In other example aspects, embodiments of FIGS. 1-3 show torque converter 10 comprising: impeller 18; turbine or turbine assembly 19 including turbine piston 20 of single-piece construction, turbine piston 20 axially movable toward and away from impeller 18; damper assembly 62 coupled to turbine 19, damper assembly 62 including: spring retainer 72; and, resilient element 80, (80A, 80B, 80C, 80D, 180), disposed between spring retainer 72 and turbine 19, arranged for applying a preload force urging the turbine against the impeller in a coast condition. In an example aspect, turbine piston 20 includes multi-plate cone clutch 38. In an example aspect, resilient element 80, (80A, 80B, 80C, 80D, 180) includes first and second contact surfaces 98 and 96 for contacting the damper assembly and the turbine, respectively. In an example aspect, damper assembly 62 further includes a plurality of springs 66 and drive plate 64, (64A, 64B, 64C, 64D, 164) for engaging the plurality of springs. In an example aspect, resilient element 80, (80A, 80B, 80C, 80D, 180) further includes a plurality of fingers 92 disposed radially inward. In an example aspect, drive plate 64, (64A, 64B, 64C, 64D, 164) further includes a plurality of openings 68 for receiving the plurality of fingers 92. In an example aspect, torque converter 10 further includes a cover for connecting to an engine (not shown) and damper assembly 62 further includes bearing assembly 94, (194); the bearing assembly including thrust surface 95 for slidingly engaging front cover 12. In an example aspect, bearing assembly 94 comprises first and second bearings 74 and 76 disposed axially on either side of the spring retainer, bearing 74 for contacting cover 12 and bearing 76 for contacting resilient element 80, (80A, 80B, 80C, 80D, 180). In an example aspect, bearings 74 and 76 are rolling bearings. In another example aspect, torque converter 110 of FIG. 3 includes bearing assembly 194 comprising thrust washer 175 disposed on the cover side of spring retainer 172 for contacting cover 112 and roller bearing 176 disposed on the turbine side of spring retainer 172 for contacting resilient element 180. In an example aspect, spring retainer 72 includes at least one lanced portion 78a and/or 78b (178a and/or 178b) for centering the bearing assembly 94, (194). In an example aspect, a first side of the turbine 19 faces the impeller 18 and a second side of the turbine 19 faces the damper 62, resilient element 80, (80A, 80B, 80C, 80D, 180) being designed such that the turbine is forced away from the impeller when a pressure on the first side of the turbine exceeds a pressure on the second side of the turbine by a predetermined amount. In an example aspect, resilient element 80, (80A, 80B, 80C, 80D, 180) is compressed when the pressure on the first side of the turbine exceeds the pressure on the second side of the turbine by the predetermined amount.

FIGS. 2A to 2D illustrate alternate embodiments of turbine assembly 19 showing diaphragm springs (80A, 80B, 80C, 80D) of different configurations. FIG. 3 illustrates an alternative embodiment wherein bearing assembly 194 includes a hydrodynamic thrust bearing or thrust washer 175 on the cover side rather than dual roller bearings as viewed in FIGS. 1 to 2D.

Other example aspects broadly comprise torque converter 10, (110) comprising: impeller 18, (118) fixedly attached at weld 13, (113) to cover 12, (112) to form a housing; turbine or turbine assembly 19, (119) including turbine piston 20, (120) and multi-plate cone clutch 38, (138), turbine piston 20, (120) axially movable toward and away from impeller 18, (118); damper assembly 62, (162) coupled to turbine 19, (119), damper assembly 62, (162) including: spring retainer 72, (172) including bearing assembly 94, (194), bearing assembly 94, (194) is in contact with cover 12, (112); and, diaphragm spring 80, (80A, 80B, 80C, 80D, 180), disposed between spring retainer 72, (172) and turbine, and having a plurality of radially inward fingers; a drive plate fixedly attached to the turbine 19, (119) and having a plurality of openings 68 for receiving the plurality of radially inward fingers 92, (192). A thrust path is generated, for example, by diaphragm spring 80 arranged for applying a preload force urging turbine 19 against impeller 18 in a coast condition; thrusting against turbine (turbine shell 22) at contact surface 96 to load multi-plate cone clutch 38; balanced by the impeller 18 fixedly attached to cover 12 at weld 13; and, rotationally separated from the cover by bearing 74 thrusting through spring retainer 72 to bearing 76 in contact with diaphragm spring 80 to close the circuit.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

LISTING OF ELEMENTS 10 (10A, 10B, 10C, 10D, 110) torque converter
11 axis of rotation
12, 112 cover or front cover
13, 113 weld
14 rear cover
16 impeller shell
18, 118 impeller
19, (19A, 19B, 19C, 19D, 119) turbine or turbine assembly
20, 120 turbine piston
22 turbine shell
24 core ring
26 turbine blades
28 blade supporting portion
30 outer radial extension
30a radially extending impeller facing surface
31 annular inner radial extension
32 blade supporting portion
33 axially extending inner circumferential section
34 impeller blades
35 hub
36 radially extending wall
36a radially extending turbine facing surface
37 core ring
38, 138 multi-plate cone clutch
39 annular inner radial extension
40 friction material
41 impeller hub
42 stator
44 stator casting
46 stator blades
48 stator body
50 one-way clutch
52 centering plate
54 thrust washer
56 inner race
58 outer race
60 springs
62, 162 damper assembly
64, (64A, 64B, 64C, 64D, 164) drive plate
66 springs
68 openings or windows
70 annular base of drive plate 64
72, 172 spring retainer
74 bearing
76, 176 bearing
78a, 78b (178a, 178b) lanced feature
80, (80A, 80B, 80C, 80D, 180) diaphragm spring or bias spring or resilient element or elastic element
82 hub
84 rivet
86 inner diameter or diaphragm spring 80
90 washer
92, 192 tabs or fingers
94, 194 bearing assembly
95 thrust surface
96 surface or contact surface or contact point
97 radially outward tabs
98 surface or contact surface or contact point
175 thrust washer

What we claim is:
1. A torque converter comprising:
a damper assembly including a spring retainer; and
a turbine assembly connected to the damper assembly, the turbine assembly including:

a turbine shell including an axially movable turbine piston;

a drive plate fixed to the turbine piston; and a diaphragm spring arranged for acting on the turbine piston with a preload force and including a plurality of radially outward tabs configured for contacting an outer surface of the turbine shell, wherein the drive plate includes openings for receiving the diaphragm spring.

2. The torque converter as recited in claim 1 further including a hub, the spring retainer configured for connecting to a transmission input shaft via the hub.

3. The torque converter as recited in claim 1, wherein the damper assembly further includes a bearing assembly, wherein the spring retainer is disposed within the bearing assembly; and wherein the diaphragm spring includes a plurality of radially inward tabs configured for contacting a turbine side surface of the bearing assembly.

4. The torque converter as recited in claim 3, wherein the plurality of radially inward tabs are received in die openings of the drive plate.

5. The torque converter as recited in claim 3 wherein the bearing assembly further includes a washer, disposed axially on a turbine side surface, for balancing a load as provided by the radially inward tabs contacting the bearing assembly.

6. The torque converter as recited in claim 1, wherein the turbine piston includes a multi-plate cone clutch.

7. A torque converter comprising:

a cover for connecting to an engine, an impeller;

a turbine including a turbine piston of single-piece construction, the turbine piston axially movable toward and away from the impeller;

a damper assembly coupled to the turbine, the damper assembly including:

a spring retainer;

a resilient element, disposed between the spring retainer and the turbine, arranged for applying a preload force urging the turbine against the impeller in a coast condition, and a bearing assembly including a thrust surface for slidingly engaging the cover and first and second bearings disposed axially on either side of the spring retainer, the first bearing arranged for contacting die cover and the second bearing arranged for contacting the resilient element.

8. The torque converter as recited in claim 7 wherein the turbine piston includes a multi-plate cone clutch.

9. The torque converter as recited in claim 7, wherein the resilient element includes first and second contact surfaces for contacting the damper assembly and the turbine, respectively.

10. The torque converter as recited in claim 7, wherein the damper assembly further includes a plurality of springs and a drive plate for engaging the plurality of springs.

11. The torque converter as recited in claim 10, wherein:

the resilient element further includes a plurality of fingers disposed radially inward; and the drive plate further includes a plurality of openings for receiving the plurality of fingers.

12. The torque converter as recited in claim 7, wherein the first and second bearings are rolling bearings.

13. The torque converter as recited in claim 7, wherein the bearing assembly comprises a thrust washer disposed on a cover side of the spring retainer for contacting the cover and a roller bearing disposed on a turbine side of the spring retainer for contacting the resilient element.

14. The torque converter as recited in claim 7, wherein the spring retainer includes at least one lanced portion for centering the bearing assembly.

15. The torque converter as recited in claim 7, wherein a first side of the turbine faces the impeller and a second side of the turbine faces the damper assembly, the resilient element being designed such that the turbine is forced away from the impeller when a pressure on the first side of the turbine exceeds a pressure on the second side of the turbine by a predetermined amount.

16. The torque converter as recited in claim 15, wherein the resilient element is compressed when the pressure on the first side of the turbine exceeds the pressure on the second side of the turbine by the predetermined amount.

17. A torque converter comprising:

an impeller fixedly attached to a cover to form a housing;

a turbine including a turbine piston and a multi-plate cone clutch, the turbine piston axially movable toward and away from the impeller;

a damper assembly coupled to the turbine, the damper assembly including:

a spring retainer including a bearing assembly, the bearing assembly in contact with the cover;

a diaphragm spring, disposed between the spring retainer and the turbine, and having a plurality of radially inward fingers; and a drive plate fixedly attached to the turbine and having a plurality of openings for receiving the plurality of radially inward fingers; and a thrust path:

wherein the diaphragm spring generates thrust and the diaphragm spring is arranged for applying a preload force urging the turbine against the impeller in a coast condition;

the diaphragm spring thrusts against the turbine at a first contact surface to load the multi-plate cone clutch;

the thrust from the turbine is balanced by the impeller fixedly attached to the cover; and the thrust from the diaphragm spring is rotationally separated from the cover by a first bearing thrusting through the spring retainer to a second bearing in contact with the diaphragm spring to close a circuit.

* * * * *